United States Patent
Watkins et al.

[15] 3,686,906
[45] Aug. 29, 1972

[54] LOCKING DEVICE

[72] Inventors: John Watkins, Wednesfield; Reginald James, Darlaston, both of England

[73] Assignee: Lowe & Fletcher Limited

[22] Filed: Aug. 26, 1970

[21] Appl. No.: 67,105

[52] U.S. Cl. ...................70/252, 70/360, 70/370, 70/380
[51] Int. Cl. ............................................B60r 25/02
[58] Field of Search........70/252, 186, 185, 184, 370, 70/380, 360

[56] References Cited

UNITED STATES PATENTS

| | | | |
|---|---|---|---|
| 2,063,088 | 12/1936 | Fitz Gerald | 70/252 |
| 3,566,635 | 3/1971 | Wolter | 70/252 |
| 2,221,082 | 11/1940 | Fitz Gerald | 70/252 |
| 2,098,189 | 11/1937 | Kistner | 70/90 |

*Primary Examiner*—Albert G. Craig, Jr.
*Attorney*—Merriam, Marshall, Shapiro & Klose

[57] ABSTRACT

A locking device for locking the steering column of a motor road vehicle and comprising a body, a spring-loaded bolt mounted therein for engagement with the rotatable shaft of the steering column, switch means for controlling the ignition circuit of the vehicle, and a key-operated lock for operation of the locking device is provided with a retaining element which holds the bolt in a releasing position in the absence of the key-operated lock. The key-operated lock forms part of a unit which can be inserted into the body after the latter has been fitted to a vehicle. The locking device includes three separate safety means for preventing inadvertent movement of the bolt to the locking position whilst the vehicle is being driven. The first safety means is constituted by the retaining element. The second safety means is constituted by a cam which is rotatable with a key-receiving member of the key-operated lock and which engages the bolt to move same to the releasing position. This cam is so formed that when in an "ignition on" position it cannot transmit drive from the spring-loaded bolt to the key-receiving member. The third safety means is constituted by a member which deadlocks the retaining element in its operative position whilst the key-receiving member is in an "ignition on" position.

31 Claims, 11 Drawing Figures

PATENTED AUG 29 1972    3,686,906

LOCKING DEVICE

BACKGROUND OF THE INVENTION

During the manufacture of motor road vehicles it is the normal practice to fit the steering column (and other movable control members, such for example as a gear change lever, or a hand brake, to which intrinsically a locking device is capable of being applied) at a stage on the assembly line of the vehicle which is far in advance of the stage at which other locking devices, such as the locks for the doors, and any lockable compartments in the interior of the vehicle, are fitted, this later stage being known generally as a trim stage.

It is desirable in many cases that the key which is capable of unlocking the locking device for the steering column or other movable control member, shall also be capable of unlocking the doors, and possibly any interior or lockable compartment of the vehicle.

If, however, to meet this requirement, the locking device, including a key-operated lock, is fitted in its entirety to the steering column or other control member, then it is necessary either at the same time to provide on the vehicle as loose or unassembled parts all the other locks to be operated by the key which is applicable to the locking device on the steering column or other movable control member, or else to ensure by appropriate administrative methods that these locks are delivered to that particular vehicle when it reaches the trim stage on the assembly line.

Both these procedures are open to considerable disadvantages.

SUMMARY OF THE INVENTION.

It is a object of the present invention to provide a locking device for locking the steering column or other movable control member of a vehicle which can be fitted without the key-operated lock to the steering column or movable control member and which will permit free movement of the steering column or other movable control member whilst the key-operated lock is absent.

According to one aspect of the invention we provide a locking device comprising a lock body formed to receive a key-operated lock which is normally retained in assembled relation with the lock body, a key-operated lock for assembly with the lock body and including a key-receiving member, bolt means mounted in the lock body and movable relative thereto by the key-operated lock, when the latter is assembled with the lock body, between a locking position and a releasing position, in the former of which it is adapted to co-operate with a further member which is required to be locked against movement and in the latter of which positions it is released from said further member to allow same to move, and retaining means for holding the bolt means in its releasing position when the key-operated lock is out of assembled relation with the lock body.

A further object of the present invention is to provide a locking device for locking the steering column or other movable control member of a vehicle, the locking device being so arranged that the possibility of the device coming into operation to lock the movable control member inadvertently whilst the vehicle is being driven is reduced as compared with known forms of locking device.

According to a further aspect of the invention we provide a locking device comprising a lock body, a key-operated lock secured in assembled relation therewith, bolt means mounted in the lock body and movable relative thereto by the key-operated lock between a locking position and a releasing position, in the former of which it is adapted to co-operate with a further member which is required to be locked against movement and in the latter of which positions it is released from said further member to allow same to move, the locking device including three separate safety means for preventing inadvertent movement of the bolt means from the releasing position to the locking position, the arrangement being such that each of the three safety means must be rendered inoperative before movement of the bolt means to the locking position can take place.

BRIEF DESCRIPTION OF THE DRAWINGS.

FIG. 4 is a fragmentary sectional view corresponding to FIG. 2 but with the bolt means in the releasing position and other parts in positions corresponding to the position of the barrel shown in FIG. 5.

Figure 1:
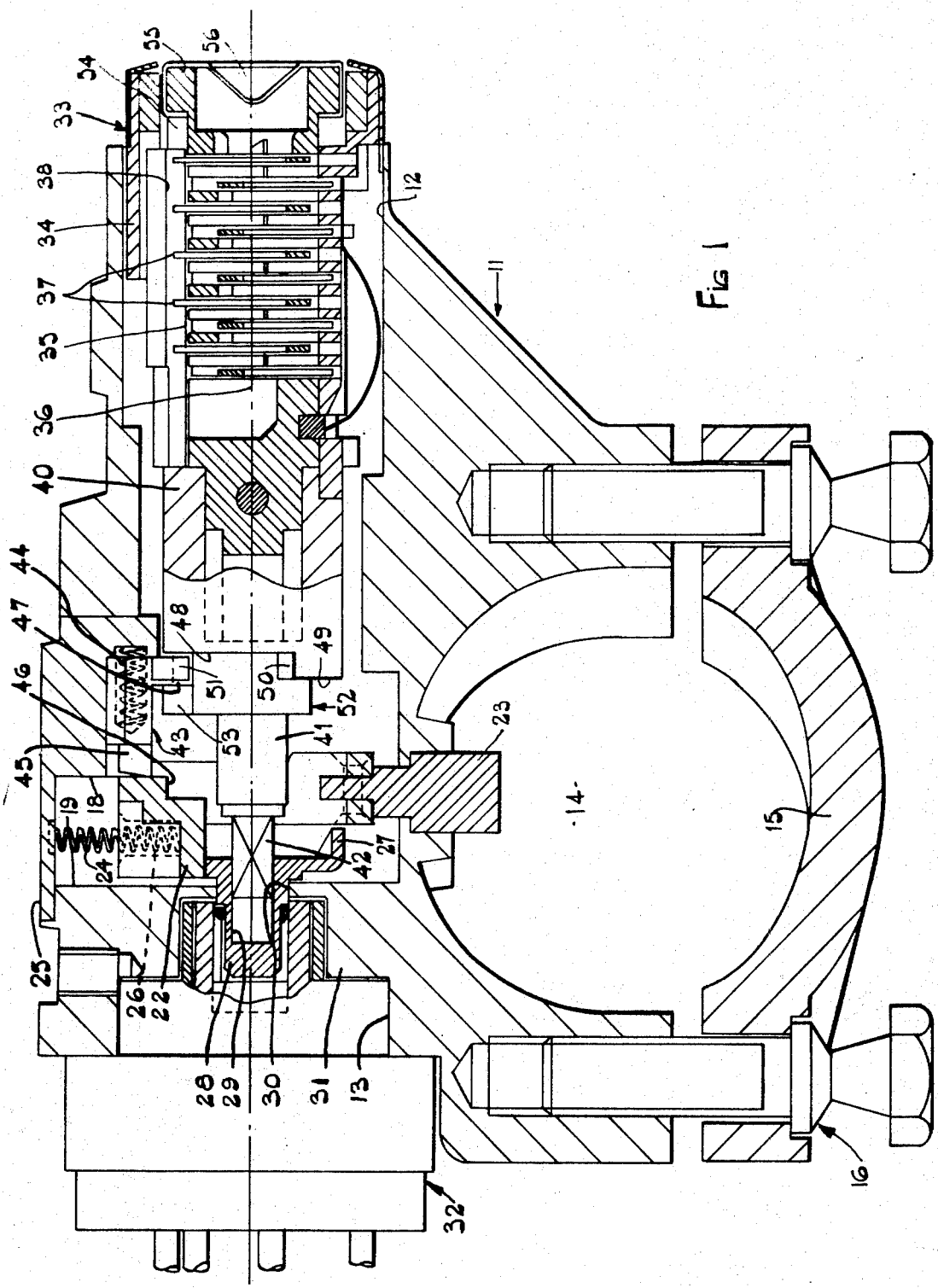
FIG. 1 shows a view, partly in cross-section, of a first embodiment of the invention, the bolt means being shown in the locking position and the key-receiving member being shown in an outer position, the key being absent from the key-receiving slot.
Figure 2:
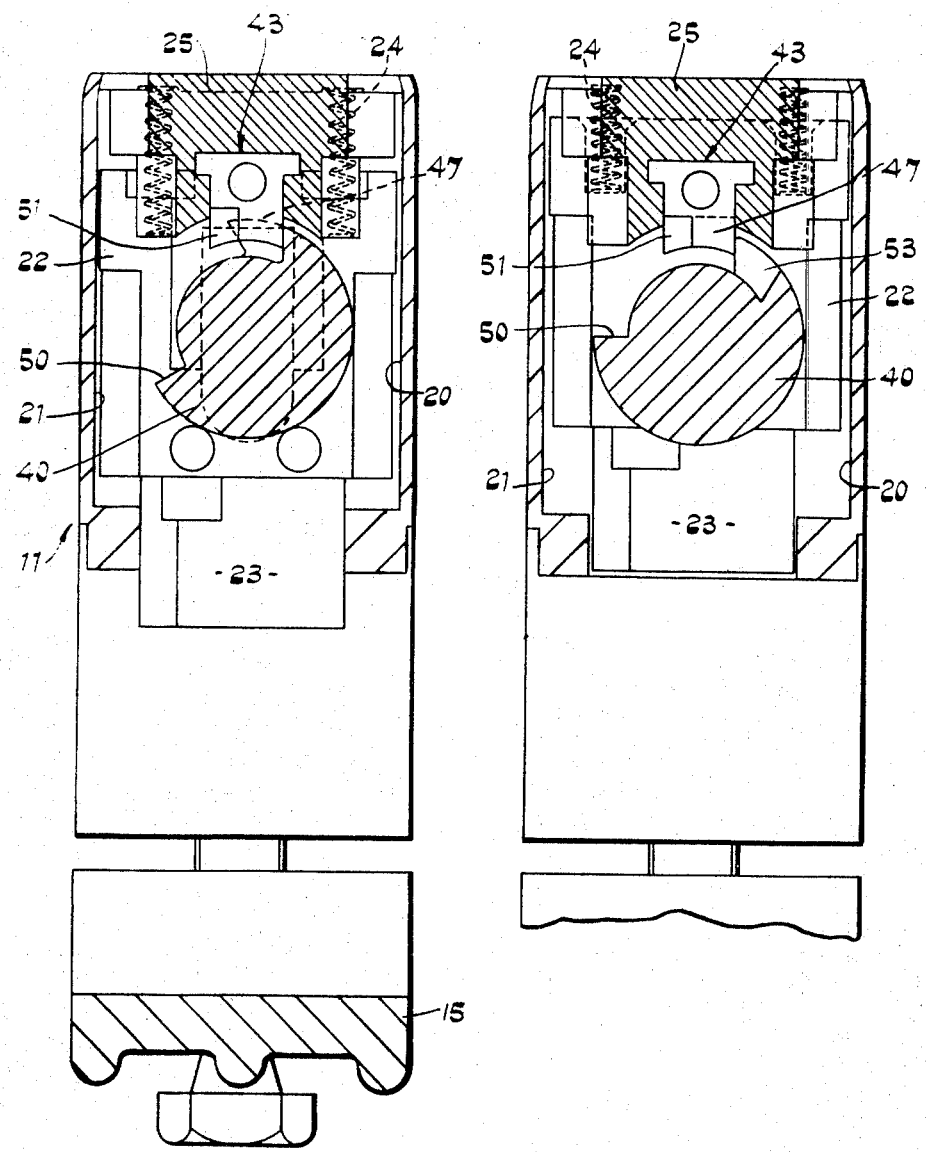
FIG. 2 is a sectional view along the line II — II of FIG. 1.

DETAILED DESCRIPTION.

The locking device shown in FIGS. 1 to 6 includes a body 11 formed at one end with a generally cylindrical bore 12 for receiving a key-operated lock, formed at the other end with a chamber 13 for receiving a portion of a switch means and formed at one side with a U-shaped cavity 14 for receiving the steering column of a motor road vehicle. A U-shaped clamping component 15 structurally separate from the body is provided for clamping the body to the steering column, the clamping component being secured to the body by means of bolts 16 which enter screw-threaded sockets 17 formed in the body 11 adjacent to the cavity 14.

Internally the body is formed with a guideway defined by faces 18, 19, 20, 21 in which is slidably mounted a bolt means comprising a bolt member 22 to which is secured a bolt tip 23 which, when the bolt means is in the locking position as shown in FIG. 1, protrudes into the cavity 14 so as to be capable of entering a slot or keyway in a bush or sleeve secured to the rotatable shaft of the steering column of the vehicle.

The bolt means is biased towards the locking position by means of coiled compression springs 24 which act between an inwardly presented face of a wall 25 of the body at the side thereof remote from the cavity 14, and the bolt member 22, each spring 24 being located within a respective socket 26 formed in the bolt member.

Figure 3:
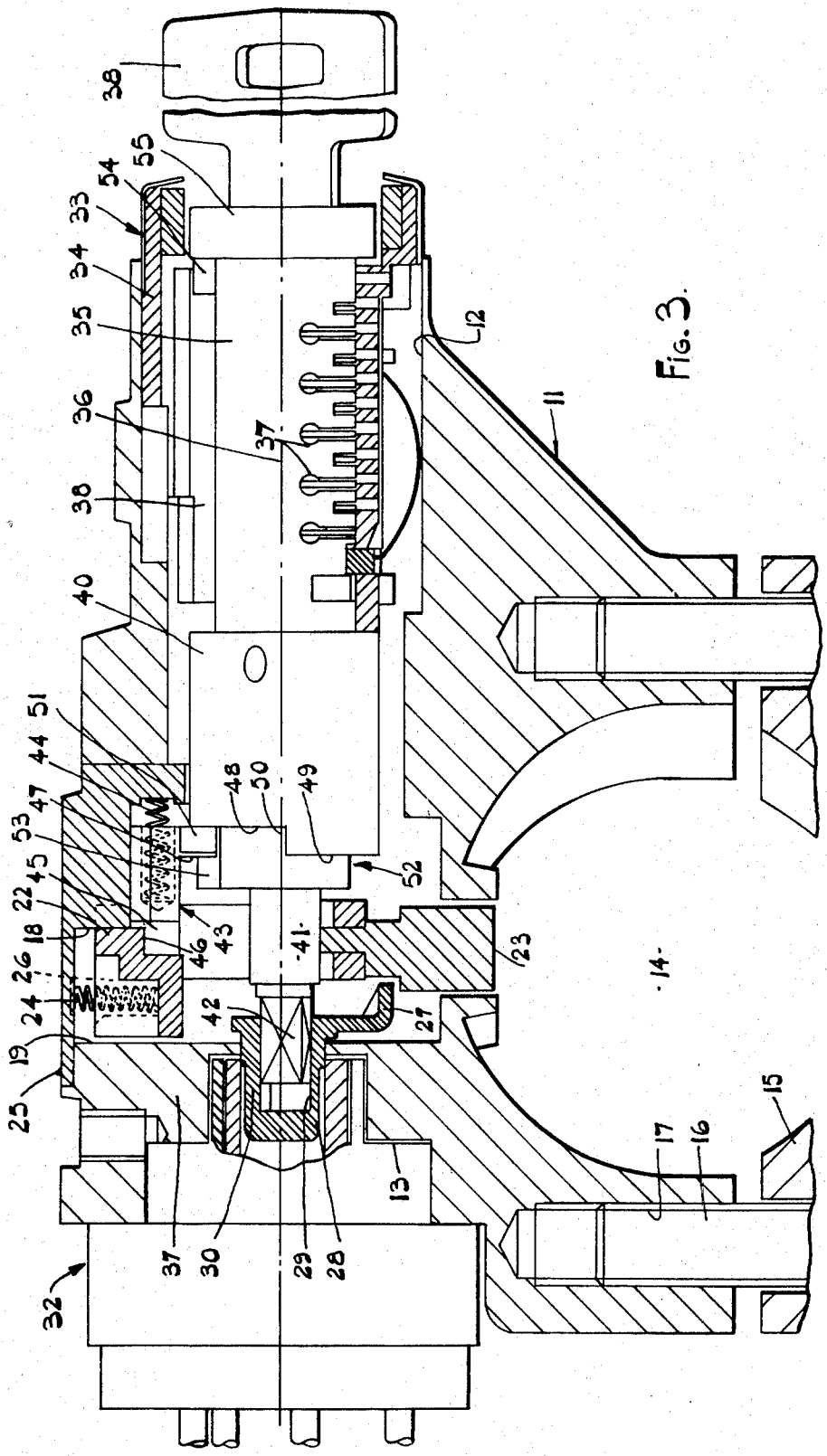
FIG. 3 is a sectional view corresponding to FIG. 1 but with the bolt means shown in the releasing position, the key present in the key-receiving slot and the key-receiving member being shown in an inner position relative to the lock body.

For moving the bolt means from the locking position to the releasing position in which it is shown in FIG. 3, and in which the bolt tip 23 is withdrawn from the cavity 14, there is provided a cam 27. The form of the periphery of the cam 27 is seen clearly in FIG. 6 wherein the periphery of the cam is indicated by a broken line. The cam 27 is formed integrally with a boss 28 formed with a socket 29 which is square in cross-section. The boss extends through a circular aperture 30 provided in an end wall 31 of the body which separates the chamber 13 from the guideway for the bolt means. The portion of the boss 29 which is disposed within the aperture 30 has an external surface which is circular when the boss is viewed in cross-section. The boss is a close fit within the aperture 30, there being sufficient clearance to permit free rotation of the boss relative to the body.

The end of the boss 28 which is remote from the cam 27 is engaged with and keyed to a rotatable operating member of a switch means 32 which is fitted within the chamber 13 and which is secured to the body 11. The switch means includes switch contacts for controlling an ignition circuit of the vehicle and further switch contacts for controlling a starter motor circuit of the vehicle. The switch means also includes a spring (not shown) which acts upon the operating member when the latter is rotated to a position in which both the ignition circuit contacts and the starter motor circuit contacts are closed, the spring biasing the operating member towards a rotational position in which the starter motor circuit contacts are open.

A key-operated lock 33 which, as shown in the drawings, is a cylinder lock is disposed within the bore 12 of the body. The cylinder lock includes a hollow housing 34 within which is mounted a rotatable key-receiving member 35, hereinafter for convenience referred to as a barrel, the axis 36 of rotation of the barrel coinciding with the axis of rotation of the cam 27. A number of locking tumblers 37 are mounted within the barrel for sliding movement therein in a direction perpendicular to the axis 36. The tumblers are individually spring-biased towards the locking positions shown in FIG. 1, in which an end portion of each tumbler projects from one side or other of the barrel 35. The end portions of those tumblers which project from the barrel at the side thereof adjacent the cavity 14 are received within respective slots formed in the housing 34, whereas the end portions of those tumblers which project from the barrel in a direction generally away from the cavity 14 are received within a common axially extending groove formed in the housing 34. Upon insertion of the correct key 39 into a key-receiving slot formed in the barrel, each of the tumblers is moved to a position in which it lies wholly within the barrel, as shown in FIG. 3.

A barrel extension 40 and an operating spindle 41 are mounted on the barrel at the end thereof remote from the mouth of the key-receiving slot, the operating spindle and extension being keyed to the barrel for rotation therewith. The extension 40 is disposed between the barrel and the bolt member 22, whereas the spindle 41 extends through an elongated aperture formed in the bolt member and includes a portion 42 which is square in cross-section and which exters the socket 29 formed in the cam boss. When the cylinder lock, barrel extension and spindle are assembled with the other components of the locking device, the cam 27 and the boss 28 are connected with the barrel 35 for rotational movement therewith. However, movement of the barrel and operating spindle relative to the cam in a direction along the axis 36 is possible to a limited extent since the portion 42 of the spindle does not extend to the end of the socket 29 when the barrel is in the normal or outer position relative to the body 1, as shown in FIG. 1.

A retaining element 43 is provided for retaining the bolt means in the releasing position. The retaining element is mounted in the body 1 for sliding movement relative thereto in a direction parallel to the axis 36 and is urged by a coiled compression spring 44 from the inactive position shown in FiG. 1 to the active position shown in FIG. 3. When the bolt means is in the locking position, the retaining element is constrained to remain in the inactive position, an end portion 45 of the retaining element abutting a face of the bolt member 22 which is presented towards the cylinder lock 33. When the bolt means is in the releasing position the retaining element is moved by the spring 44 to the active position in which the end portion 45 engages beneath a shoulder 46 presented by the bolt member towards the cavity 14. Whilst the retaining element remains in its active position the bolt means is positively held in the releasing position.

Remote from the end portion 45, the retaining element 43 is provided with a tooth 47 which projects towards the axis 36. The end face of the barrel extension 40 which is remote from the barrel 35 includes a portion 48 to one side of the axis 36 which, when the retaining element is in the inactive position and the barrel is in an outer position abuts an axially presented face of the tooth. The barrel is thus prevented from moving axially to the inner position whilst the retaining element remains in its inactive position.

The end face of the barrel extension 40 includes a further portion 49 which is spaced further from the barrel 35 than is the portion 48. The face portions 48 and 49 are connected by a shoulder 50. Upon rotation of the barrel from the position shown in FIG. 1 in a clockwise direction as viewed from the exposed end of the barrel, the shoulder 50 approaches an inclined face 51 formed on the tooth 47. During normal operation of the lock, the retaining element moves to the active position before the shoulder 50 engages with the tooth. However, in the event that the retaining element does not so move to the active position, the shoulder 50 engages with the inclined face 51 in such a manner as to produce a caming action between the barrel extension 40 and the retaining element 43 which would positively displace the retaining element to the active position. On the other hand, if the retaining element is jammed in its inactive position and cannot move to the active position, engagement of the shoulder 50 with the inclined face 51 will prevent further rotation of the barrel. The shoulder 50 therefore acts as a stop means to prevent rotation of the barrel into an "ignition on" position in which the switch contacts controlling the ignition circuit of the vehicle are closed, whilst the retaining element remains in the inactive position.

If the retaining element 43 moves to the active position, the tooth 47 moves axially beyond the face 49 of the barrel extension and rotation of the barrel to operate the switch means 32 can take place unimpeded, provided that the barrel remains in the outer axial position.

A coupling element 52 is mounted on the operating spindle 41 adjacent to the barrel extension 40. The coupling element is keyed to, or formed integrally with, the barrel extension. The coupling element includes a projection 53 which extends radially outwardly of the axis 36 and is disposed at substantially the same distance from this axis as is the tooth 47. When the retaining element is in the active position and the barrel 35 is in the outer position, upon rotation of the barrel in an anti-clockwise direction from the "ignition on" position towards the locked position, the projection 53 comes into contact with the tooth 47, as shown in FIG. 4. Thus, further anti-clockwise rotation of the barrel is prevented. Upon axial movement of the barrel to the inner position shown in FIG. 3, the projection 53 is moved to a position behind the tooth 47 and the barrel can then be rotated slightly in an anti-clockwise direction to bring the projection 53 into axially overlapping relation with the tooth 47, so coupling the barrel to the retaining element 43 for axial movement of the latter by the barrel.

A blocking element 54 projects radially from the barrel 35 adjacent to the head 55 thereof. As shown in FIG. 4, when the barrel is in such a rotational position that the projection 53 on the coupling element abuts a side face of the retaining element 43, the blocking element is aligned with the groove 38 formed in the housing. Thus, when the barrel is in this rotational position, it can be moved axially to an inner position. As seen clearly in FIG. 5, the width of the blocking element 54 is somewhat less than the width of the groove 38 and thus a small amount, typically 15°, of rotation of the barrel is possible whilst the blocking element remains within the groove. However, the blocking element constrains the barrel to remain in an axially outer position whilst it is in any rotational position not lying within this 15° range. The blocking element 54 is off-set to one side of the key-receiving slot and whilst the barrel is in the inner position and the blocking element lies within the groove 38, the barrel cannot be rotated into a position in which the tumblers are completely aligned with the grooves 38 in the housing. Since the tumblers cannot be displaced outwardly of the barrel, the key cannot be withdrawn therefrom until the barrel is moved to the outer position and is rotated slightly to bring the tumblers into alignment with the grooves.

There will now be described the sequence of operations by which the locking device is operated to permit the vehicle to be driven and subsequently to lock the steering column of the vehicle.

Figure 5:
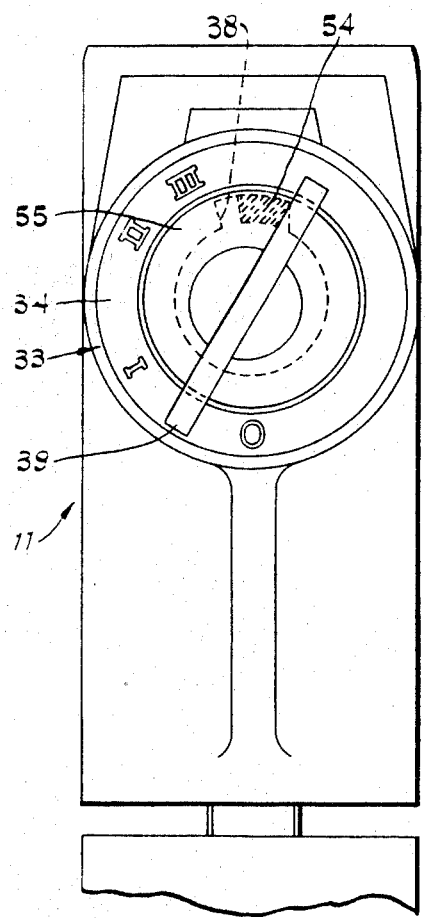
FIG. 5 shows a fragmentary end elevation of the lock shown in FIG. 1, the barrel being in a rotational position intermediate the locked and unlocked positions, and the key being present in the key-receiving slot.

Whilst the key is absent from the key-receiving slot 56 the bolt means is in the locking position, the retaining element 43 is in the inactive position and the barrel 35 is in an outer axial position and in a first rotational position in which the key-receiving slot is aligned with a zero marked upon the outer face of the housing, and shown in FIG. 5. Insertion of the key 39 into the key-receiving slot 56 causes the tumblers 37 to be withdrawn into the barrel, thus freeing the latter for rotation relative to the housing 34. The barrel is rotated in a clockwise direction to a second rotational position, in which the key-receiving slot is aligned with a numeral 1 marked upon the housing. Such rotation of the barrel causes the cam 27 to engage the bolt means and move the latter to the releasing position. The retaining element immediately moves to the active position. Axial movement of the barrel is prevented since the blocking element 54 is not completely aligned with a groove in the housing.

Figure 6:
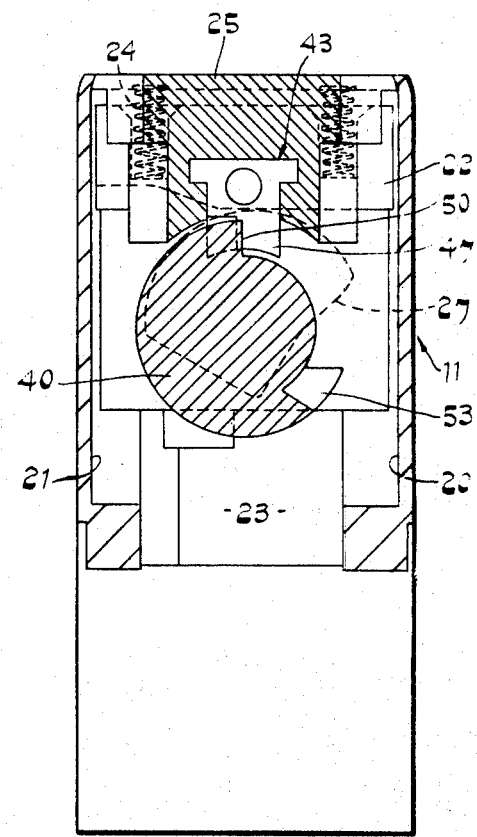
FIG. 6 shows a fragmentary sectional view corresponding to FIG. 4 but with the parts in positions corresponding to an "ignition on" position of the key receiving member.

When the barrel is rotated further in the clockwise direction to a third rotational position, herein called the "ignition on" position, in which the key-receiving slot is aligned with a numeral .II marked upon the housing, the switch means is operated to close ignition switch contacts which control energization of the ignition circuit of the vehicle. Also further rotational movement of the cam 27 permits the bolt means to move slightly towards the locking position until the shoulder 46 rests upon the end portion 45 of the retaining element. As the barrel is moved into the "ignition on" position the shoulder 50 moves across the inclined face 51 and when the "ignition on" position is reached, the face portion 49 of the barrel extension is axially overlapped with the inclined face 51 on the tooth 47, as shown in FIG. 6. In order to start the engine of the vehicle, the barrel is rotated further in the clockwise direction to a fourth rotational position, in which the key-receiving slot is aligned with a numeral III on the housing. This closes switch contacts in a starter motor circuit which energizes the starter motor of the vehicle. A user can hold the barrel in this fourth rotational position by means of the key. When the key is released the spring within the switch means returns the barrel to the "ignition on" position.

In order to immobilize the vehicle after a period of running, the barrel is rotated from the "ignition on"

position in an anti-clockwise direction to the position illustrated in FIG. 5 which is intermediate between the first and second rotational positions. At this intermediate position anti-clockwise rotation of the barrel is arrested by engagement of the projection 53 on the coupling element with the tooth 47 on the retaining element. The barrel is then depressed to the inner position, this being possible since the blocking element 54 is aligned with a groove 38 in the housing. The barrel is rotated slightly in an anti-clockwise direction to couple the retaining element with the barrel, whereupon the barrel is withdrawn by means of the key to the outer position, thus withdrawing the retaining element to the inactive position. Since anti-clockwise rotation of the barrel has brought the cam 27 clear of the bolt means, the bolt means moves to the locking position immediately the barrel is withdrawn to the outer position. In order to withdraw the key from the barrel, it is necessary to rotate the latter slightly in an anti-clockwise direction to align the tumblers completely with the grooves 38.

It will be noted that axial movement of the barrel in each direction can be effected only by a deliberate movement on the part of the user, there being absent any springs which act upon the barrel to move the latter in one or other axial direction.

If required, the locking device can be assembled on a vehicle with the bolt means held in the releasing position without the cylinder lock being assembled with the body. The cylinder lock housing, barrel, barrel extension, coupling element and operating spindle may be formed as a unit for insertion into the body after the remaining parts of the locking device have been assembled upon the vehicle. The retaining element will be effective to hold the bolt means in the releasing position until such time as this unit is inserted and the cylinder lock is operated to withdraw the retaining element to the inactive position.

Since the key does not at any stage project through the inner end of the barrel, the key-receiving slot in the latter is permanently closed at one end.

It will be noted that the locking device described with reference to FIG. 1 through 6 includes three separate safety means for preventing inadvertent movement of the bolt means to the locking position when the vehicle when the vehicle is being driven. The first of these safety means is constituted by the spring-loaded retaining element 43 which, when in its active position, engages with the bolt member 22 and positively prevents movement of the bolt means to the locking position. The second of these safety means is constituted by the cam 27, the shape of which is such that when the barrel is in the "ignition on" position the cam is incapable of transmitting drive from the bolt means to the barrel to rotate the latter towards the first rotational position. Rotation of the cam from the "ignition on" position towards the first rotational position brings the cam into contact with the bolt member 22 and produces a small movement of the bolt means in a direction away from the locking position. Such movement of the bolt means is opposed by the springs 24. Thus, rotation of the cam from the "ignition on" position in a direction towards the first rotational position is opposed more strongly by the bolt means and springs 24 than is rotation in the opposite direction from the "ignition on" position. The third safety means is constituted by the face portion 49 of the barrel extension which, when the barrel is in the "Ignition on" position, deadlocks the retaining element in its active position. It will be appreciated that, once the barrel has been rotated to the "ignition on" position each of these safety means must be rendered inoperative before the bolt means can move to the locking position.

Referring now to the locking device shown in FIGS. 7 through 11, parts corresponding to those previously described with reference to FIGS. 1 through 6 are indicated by like reference numerals with the prefix 1, and the preceding description is to be deemed to apply thereto insofar as these parts are not described with reference to FIGS. 7 through 11. The following description will be confined to differences between the two embodiments shown in the drawings.

Figure 7:
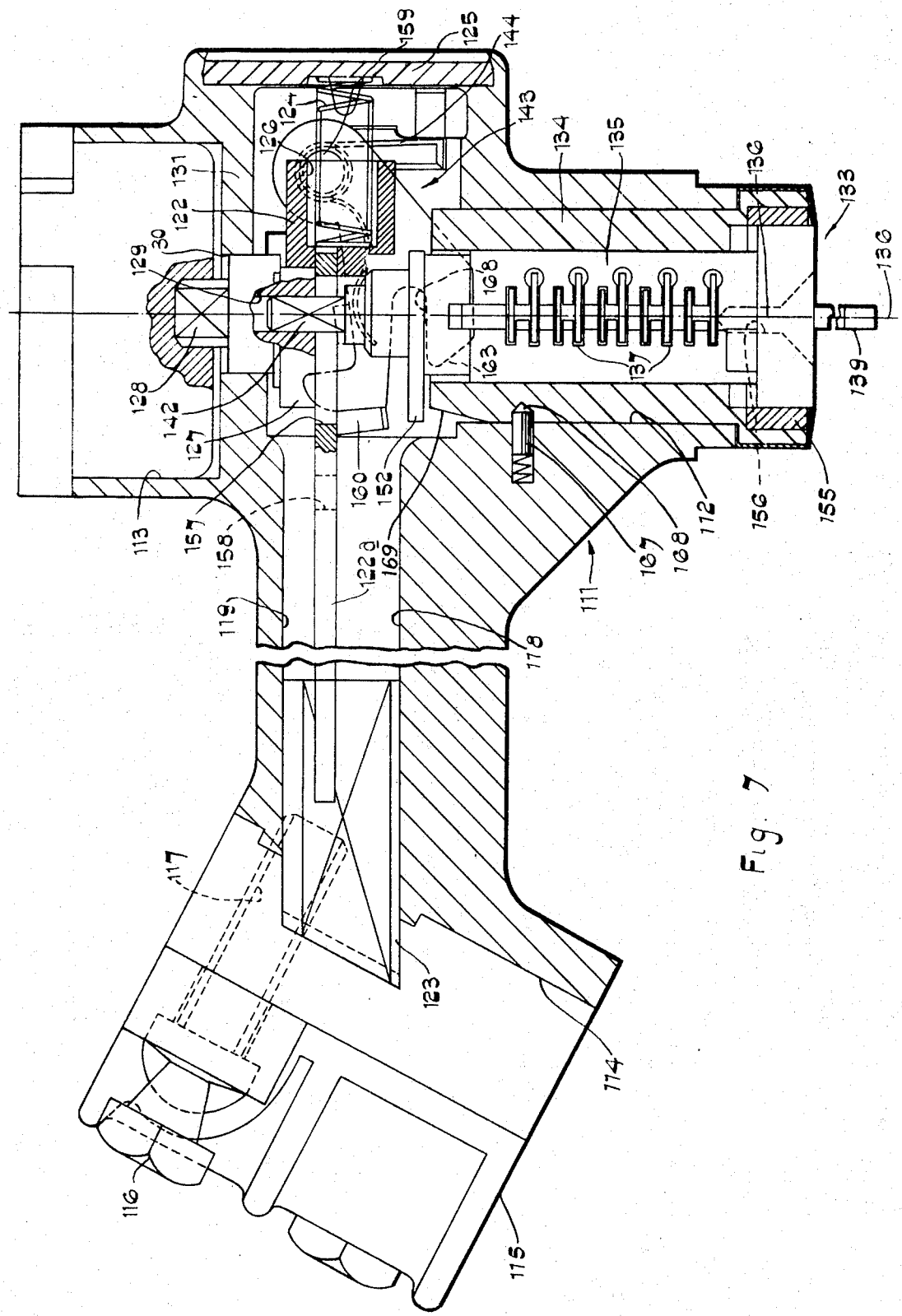
FIG. 7 shows a view partly in cross-section of a second embodiment, the bolt means being shown in the locking position, the key-receiving member being shown in an outer position and the key being present in the key-receiving slot.

The bolt means shown in FIG. 7 comprises three components, the first of which is a bolt tip 123 arranged to protrude, when the bolt means is in the locking position, into a cavity 114 for engagement with the steering column of a vehicle to which the locking device is fitted. When the bolt means is in the releasing position the bolt tip is withdrawn from this cavity. The bolt means further comprises a bolt member 122 engaged by a bolt spring 124, and a bolt lath 122a which interconnects the bolt member and the bolt tip and is rigidly secured to each of these components.

The bolt lath is formed with an elongated aperture 157 through which a portion 142 of an operating spindle extends. The bolt lath is also formed at one side with a notch 158 in which the retaining element 143 can engage.

Figure 10:
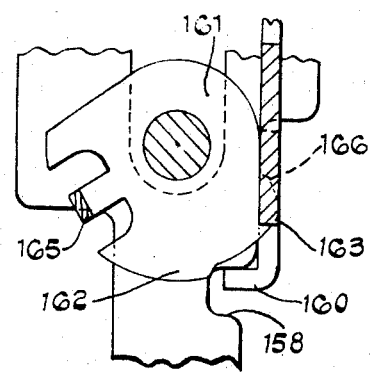
FIG. 10 shows a fragmentary sectional view corresponding to FIG. 9 but with certain parts displaced relative to those shown in FIG. 9 by axial movement of the key-receiving member to an inner position and by a small rotation of the key-receiving member in an anti-clockwise direction as viewed in FIG. 10.
Figure 11:
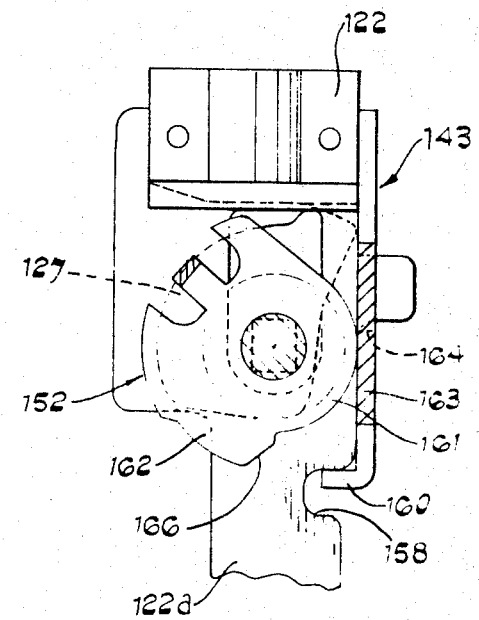
FIG. 11 shows a fragmentary sectional view on the line XI — XI of FIG. 8.

The retaining element 143 is pivotally mounted in the body 111 for movement in a plane transverse to the direction of movement of the bolt means between the locking and releasing positions, and parallel to the axis 136 of the barrel 135 of a key-operated lock. The retaining element is mounted on a pivot 159 adjacent one side of the bolt member 122. At a position remote from the pivot 159 the retaining element is provided with a tab 160 which projects out of the general plane of the retaining element as shown in FIGS. 9 through 11.

Figure 8:
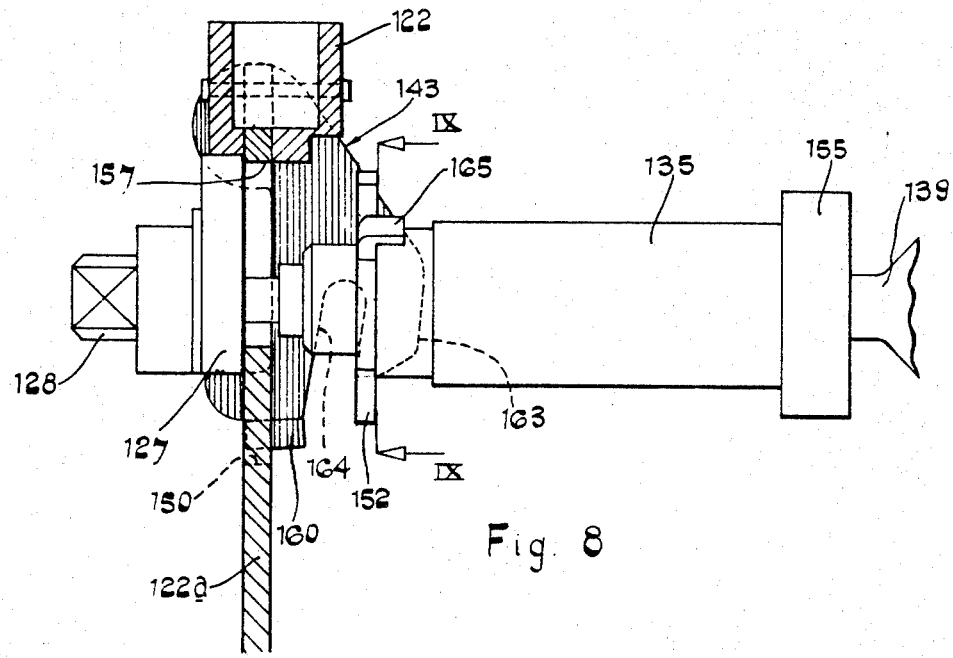
FIG. 8 is a fragmentary sectional view corresponding to FIG. 7, but with the bolt means shown in the releasing position.

When the bolt means is in the locking position and the retaining element is in the inactive position, as shown in FIG. 7, the tab 160 abuts a face of the bolt lath 122a which is presented towards the cylinder lock 133. When the bolt means is in the releasing position and the retaining element is in the active position, as shown in FIG. 8, the tab 160 is disposed within the notch 158, thus holding the bolt means in the releasing position against the action of the bolt spring 124. The retaining element is biased towards the active position by a retainer biasing means in the form of a torsion spring 144.

Figure 9:
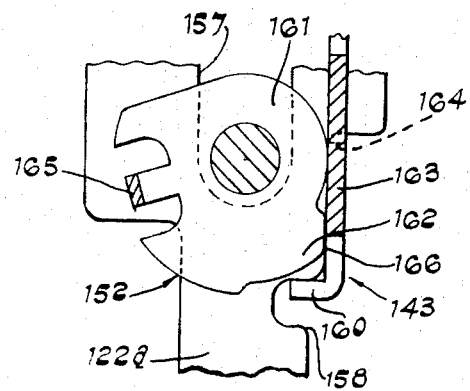
FIG. 9 shows a cross-sectional view corresponding to a section on the line IX — IX of FIG. 8, the bolt means being shown in the releasing position and other parts being shown in positions which correspond to a rotational position of the barrel intermediate the locked and unlocked positions.

The barrel 135 of the key-operated lock is provided at its inner end with a coupling element 152, the peripheral shape of which is shown clearly in FIG. 9. The coupling element includes a portion 161 having a smaller radius such that it does not extend from the axis 136 to a distance greater than the smallest distance between the retaining element 143 and the axis. The coupling element also includes a portion 162 of larger radius such that when the barrel is in an appropriate rotational position it overlaps axially with a portion of the retaining element.

The retaining element includes a tooth 163 which extends transversely of the axis 136 and is spaced towards the barrel 135 from the major part of the retaining element which carries the tab 160. The arrangement is such that when the retaining element is in the active position and the barrel is in a normal outer position, the coupling element 152 is aligned with the tooth 163, as shown in FIG. 8. When the retaining element is in the active position and the barrel is displaced to an inner position, the coupling element is aligned with a slot 164 which separates the tooth 163 from the major portion of the retaining element.

The form of various components of the locking device, and the manner in which these components cooperate will be further understood from the following description of the operation of the locking device shown in FIGS. 7 through 11.

When the key 139 is absent from the key-receiving slot 156, the bolt means is in the locking position, the retaining element is in the inactive position and the barrel is in an outer position, as shown in FIG. 7. Insertion of the key into the key-receiving slot of the barrel 135 withdraws the tumblers 137 from grooves formed in the housing 134 and thus frees the barrel for rotation relative to the housing and to the body 111. The barrel is rotated from the first rotational position to a second rotational position, such rotation causing the cam 127 to move the bolt means from the locking position to the releasing position, whereupon the retaining element moves to the active position. The form of the cam 127 is such that when the barrel is in the second rotational position the bolt springs 124 are compressed to a maximum extent.

When the barrel is rotated further in a clockwise direction to a third rotational position, the cam 127 moves to the position shown in FIG. 11, thus permitting the bolt member 122 to move slightly towards the locking position until the bolt lath 122a engages fully with the tab 160. When the barrel is in the third rotational position, which is an "ignition on" position, the cam 127 is just clear of the bolt member 122.

The barrel can be rotated further in the clockwise direction to a fourth rotational position in which switch contacts controlling energization of a starter motor, and included in switch means normally fitted within the chamber 113 (but not shown in FIG. 7), would be closed. Further clockwise movement of the barrel is prevented by engagement with a finger 165 on the coupling element which extends into the housing 134 and engages with a shoulder thereof. Upon release of the key the barrel would normally be returned to the "ignition on" position by a spring within the switch means.

Whilst the barrel is in any of the second, third and fourth rotational positions, the smaller radius part 161 of the coupling element is presented towards the retaining element. However, upon rotation of the barrel in an anti-clockwise direction preparatory to immobilizing the vehicle, a shoulder 166 on the coupling element between the parts 161 and 162 thereof is brought into engagement with the tooth 163, as shown in FIG. 9. Such engagement prevents further anti-clockwise rotation of the barrel until the latter is moved axially to an inner position whereupon slight further anti-clockwise rotation of the barrel brings the larger radius part 162 of the coupling element into axially overlapping relation with the tooth 163, as shown in FIG. 10. The barrel can now be withdrawn, this withdrawing the retaining element to the inactive position whereupon the bolt means moves to the locking position. The barrel can now be returned to the first rotational position and the key withdrawn.

It will be noted that the form of the cam 127 is such that when the barrel is in the "ignition on" position rotation of the cam and barrel towards the first rotational position requires slight compression of the bolt spring 124. Thus, movement of the cam from this position in a direction towards the first rotational position is opposed by the bolt member 122 and the bolt spring to a greater extent than is movement in the opposite direction.

The locking device may be assembled upon a vehicle without the cylinder lock 133 being fitted within the body 111. The lock barrel 135, housing 134, coupling element 152 and operating spindle form a unit which can be inserted into the body after the remaining components of the locking device have been fitted to a vehicle. In the absence of this unit the retaining element 143 will be effective to hold the bolt means in the releasing position. This feature is especially advantageous since during assembly of motor vehicles it is convenient to fit the body of the locking device to the steering column of the vehicle at a stage well in advance of the stage at which locks are fitted to the vehicle. Since normally a common key is used for operating both the locking device fitted to the steering column, and door locks or luggage compartment locks, it is convenient to fit all key-operated locks to the vehicle at the same stage of assembly and this stage is normally one at which the vehicle is largely completed. During the period between fitting the lock body to the vehicle and fitting the key-operated locks thereto, it is normally necessary to be able to rotate the steering column of the vehicle. This is made possible by providing a locking device wherein the bolt means may be held in the releasing position whilst the key-operated lock is absent from the lock body.

For securing the cylinder lock 133 in the body 111, once inserted, respective securing means are provided in the body and in the housing 134. The former securing means comprises a latch element in the form of a plunger 167 mounted in a radially extending bore which opens into the axially extending bore 112. The plunger is spring-urged to the operative position shown in FIG. 7 in which it projects inwardly of the bore 112 to enter a socket 168 formed in the housing 112 and which constitutes the securing means in the housing referred to above. A chamfer 169 is formed on the housing 112 at the end thereof remote from the barrel head 155 to engage the plunger and to displace same outwardly of the bore 112 during insertion of the cylinder lock thereinto. It will be noted that the plunger 167 and its spring biasing means are disposed entirely internally of the body so that the securing means is inaccessible from the exterior of the locking device when the latter is fully assembled.

We claim:

1. In a locking device comprising:

a. a lock body formed to receive a key-operated lock,

11 b. a key-operated lock for assembly with the lock body and including a key-receiving member,
c. bolt means mounted in the lock body and movable relative thereto by the key-operated lock, when the latter is assembled with the lock body, between a locking position and a releasing position, in the former of which it is adapted to co-operate with a further member which is required to be locked against movement and in the latter of which positions it is released from said further member to allow same to move, the improvement wherein:
   i. a first unit which includes at least said body, said bolt means and a retaining means for holding the bolt means in its releasing position when the key-operated lock is out of assembled relation with the lock body, presents a chamber having an opening,
   ii. a second unit includes at least said key-receiving member,
   iii. said chamber and said second unit have respectively such external forms as to provide the capability of insertion of said second unit through said opening into said chamber,
   iv. said first and second units include respective securing means co-operable, when the second unit is inserted into said chamber, for securing the second unit therein, the securing means of the first unit being disposed entirely internally of said body whereby the securing means of both units are inaccessible from the exterior of the body when the first and second units are in assembled relation.

2. The improvement according to claim 1 wherein one of said securing means comprises a latch element resiliently biased to engage with the other securing means when the first and second units are in assembled relation, the latch element being displaceable against the action of the biasing means to admit of insertion of the second unit into said chamber.

3. In a locking device comprising:
a. a lock body formed to receive a key-operated lock,
b. a key-operated lock for assembly with the lock body and including a key-receiving member,
c. bolt means mounted in the lock body and movable relative thereto by the key-operated lock, when the latter is assembled with the lock body, between a locking position and a releasing position, in the former of which it is adapted to co-operate with a further member which is required to be locked against movement and in the latter of which positions it is released from said further member to allow same to move, the improvement wherein:
   i. a first unit which includes at least said body, said bolt means, retaining means for holding the bolt means in its releasing position when the key-operated lock is out of assembled relation with the lock body, retainer biasing means and a cam rotatably mounted in the lock body for engagement with the bolt means for moving same from the locking position to the releasing position, presents a chamber having an opening,
   ii. the retaining means comprises a retaining element movable between an active position and an inactive position, in the former of which it is operative to hold the bolt means in the releasing position and in the latter of which it is so positioned that is does not impede movement of the bolt means to the locking position,
   iii. said retainer biasing means is adapted for resiliently biasing the retaining element from the inactive position to the active position,
   iv. said cam is provided with a socket for receiving an operating spindle and is adapted to be keyed to said spindle,
   v. a second unit includes at least said key-receiving member, coupling means for transmitting force from the key-operated lock, when the latter is assembled with the lock body, to the retaining element for moving the latter to the inactive position, and said spindle, the latter being secured on the key-receiving member
   vi. said chamber and said second unit have respectively such external forms as to provide the capability of insertion of said second unit through said opening into said chamber, and
   vii. the locking device further comprises means for securing the second unit in said chamber in assembled relation with the first unit.

4. A locking device according to claim 3 wherein said second unit further includes a housing within which the key-receiving member is mounted for rotation relative thereto.

5. In a locking device comprising a lock body, a key-operated lock secured in assembled relation therewith, bolt means mounted in the lock body and movable relative thereto by the key-operated lock between a locking position and a releasing position, in the former of which it is adapted to co-operate with a further member which is required to be locked against movement and in the latter of which positions it is released from said further member to allow same to move, the improvement wherein there is provided three distinct safety means, each of which must be rendered inoperative before the bolt means can move from the releasing position to the locking position, and each of which can be rendered inoperative only by movement transmitted from an operator to the safety means through the intermediary of the key-receiving member.

6. The improvement according to claim 5 wherein:
a. the first of said three safety means comprises a retaining element movable transversely of the direction of movement of the bolt means between an active position and an inactive position, in the former of which the retaining element is engaged with both the bolt means and the body and in the latter of which positions the retaining element is released from one of the body and the bolt means,
b. coupling means is provided for transmitting force from the key-operated lock to the retaining element for moving the latter to the inactive position,
c. means is provided for moving the retaining element to the active position upon movement of the bolt means to the releasing position.

7. The improvement according to claim 6 wherein retainer biasing means is provided for resiliently biasing the retaining element towards the active position.

8. The improvement according to claim 6 wherein:
a. the key-operated lock includes a key-receiving member which is rotatable relative to the body,
b. the second of said safety means comprises stop means carried on the key-operated lock and engageable with the retaining element for positively preventing movement of the latter out of the active position excepting when the key-operated lock is in a predetermined rotational position relative to the body.

9. The improvement according to claim 8 wherein the third of said safety means comprises drive means for transmitting drive between the bolt means and the key-operated lock only in a direction from the key-operated lock to the bolt means.

10. The improvement according to claim 9 wherein said drive means comprises a cam mounted in the body for rotation relative thereto and drivingly connected with the key-operated lock, the cam being engageable with the bolt means for moving the latter from the locking position to the releasing position, and the cam being so formed as to avoid transmission of drive from the bolt means to the key-operated lock through the intermediary of the cam.

11. The improvement according to claim 10 wherein:
a. the key-operated lock includes a key-receiving member which is rotatable with said cam in one direction to bring about movement of the bolt means from the locking position to the releasing position, such rotation being:
from a first rotational position which corresponds to the bolt means being in the locking position,
through a second rotational position which corresponds to the bolt means being in the releasing position,
to a third rotational position in which it remains whilst a vehicle to which the locking device is applied is being driven,
b. the key-receiving member and the cam are rotatable in the other direction to bring about movement of the bolt means to the locking position,
c. the form of the cam is such that when in the third rotational position, rotation of the cam towards the second rotational position is opposed more strongly than is rotation away from the second rotational position.

12. In a locking device comprising;
a. a lock body,
b. bolt means mounted in the lock body for movement relative thereto along a guideway between a locking position and a releasing position, in the former of which it is adapted to co-operate with a further member which is required to be locked against movement and in the latter of which positions it is released from said further member to allow same to move,
c. bolt biasing means for biasing the bolt means towards the locking position,
d. a retaining element mounted in the lock body and movable transversely of said guideway between an active position and an inactive position, in the former of which it is engaged with both the body and the bolt means positively to prevent movement of the bolt means to the locking position, and in the latter of which positions it is released from one of the body and bolt means, and
e. a key-operated lock secured in assembled relation with the body, the key-operated lock comprising a key-receiving member formed with a key-receiving slot and movable relative to the body both rotationally and along the axis of rotation, tumbler means movable in relation to the key-receiving member between a locking position in which said tumbler means engages partly in the body and partly in the key-receiving member and a releasing position in which the tumbler means is disposed wholly within one of the body and the key-receiving member, the tumbler means being displaceable by the key, when the latter is inserted into the key-receiving slot, to the releasing position, and tumbler biasing means for urging the tumbler means into the locking position,
the improvement wherein:
f. the retaining element is pivotally mounted in the body for movement in a plane generally parallel to the axis of the key-receiving member,
g. coupling means is provided on the key-receiving member for engagement with the retaining element when the latter is in the active position and when the key-receiving member is moved along its axis from an outer position to an inner position with respect to the body,
h. said coupling means is adapted to transmit movement generally in a direction towards and away from the bolt means from the key-receiving member to the retaining element, whereby the retaining element can be moved to the inactive position by axial movement of the key receiving member.

13. The improvement according to claim 12 wherein:
a. the retaining element is mounted in the body for sliding movement in a direction generally parallel to the axis of rotation of the key-receiving member, and
b. said coupling projection is adapted to transmit axial movement from the key-receiving member to the retaining element.

14. In a locking device comprising:
a. a lock body,
b. bolt means mounted in the lock body for movement relative thereto along a guideway between a locking position and a releasing position, in the former of which it is adapted to co-operate with a further member which is required to be locked against movement and in the latter of which positions it is released from said further member to allow same to move,
c. bolt biasing means for biasing the bolt means towards the locking position,
d. a retaining element mounted in the lock body and movable transversely of said guideway between an active position and an inactive position, in the former of which it is engaged with both the body and the bolt means positively to prevent movement of the bolt means to the locking position, and in the latter of which positions it is released from one of the body and bolt means, and
e. a key-operated lock secured in assembled relation with the body, the key-operated lock comprising a key-receiving member formed with a key-receiving slot and movable relative to the body both rotationally and along the axis of rotation, and tumbler means movable relative to the key-receiving member by the key when the latter is inserted into the key-receiving slot and engageable only when the key-receiving member is in an outer axial position and a first rotational position in both of the key-receiving member and the housing thereby to prevent movement of the key-receiving member relative to the housing and to permit removal of the key from the key-receiving slot, the improvement wherein:

f. there is provided on the key-receiving member a coupling projection which extends transversely of the axis thereof, g. there is provided on the retaining element a tooth which also extends transversely of the axis of the key-receiving member and which lies at substantially the same distance from the axis as does the coupling projection, h. when the retaining element is in the active position and the key-receiving member is in the inner position, said coupling projection and said tooth are off-set relative to one another axially, the tooth lying between the coupling projection and the key-receiving member, whereby the key-receiving member can be coupled with the retaining element by rotation of the former in the inner position, and the retaining element can be withdrawn from the active position to the inactive position by movement of the key-receiving member from the inner position to the outer position, i. when the retaining element is in the active position and the key-receiving member is in the outer position the tooth is disposed in the path of rotational movement of the coupling projection, and j. the tooth and coupling projection are arranged to overlap axially when the key-receiving member is in said first rotational position, whereby rotation of the key-receiving member to the first rotational position is prevented whilst the retaining element is in the active position and the key-receiving member is in the outer position.

15. The improvement according to claim 14 wherein:

a. the locking device further comprises switch means including ignition switch contacts for controlling energization of an ignition circuit in a vehicle when the locking device is fitted to the vehicle, b. said switch means is connected with the key-receiving member for operation by rotation thereof from said first rotational position when the key-receiving member is in the outer position, and c. co-operating means are provided on the key-receiving member and on the housing for preventing axial movement of the key-receiving member to the inner position whilst the key-receiving member is in a rotational position which corresponds to a closed condition of said ignition switch contacts.

16. The improvement according to claim 15 wherein stop means is provided for preventing rotation of said key-receiving member whilst in the outer position to close said ignition switch contacts, if the retaining element is in the inactive position.

17. The improvement according to claim 16 wherein said stop means is arranged for moving the retaining element positively into the active position upon rotation of the key-receiving member to close said ignition switch contacts.

18. The improvement according to claim 16 wherein:

a. the locking device further includes a lock housing structurally separate from the body but rigidly secured thereto, and b. the key-receiving member is mounted in the housing for movement relative thereto both rotationally and along the axis of the key-receiving member.

19. In a locking device comprising:

a. a lock body defining an internal guideway, b. bolt means mounted in the lock body for movement relative thereto along said guideway between a locking position and a releasing position, in the former of which it is adapted to co-operate with a further member which is required to be locked against movement and in the latter of which positions it is released from said further member to allow same to move, c. bolt biasing means for biasing the bolt means towards the locking position, d. a retaining element mounted in the lock body and movable transversely of said guideway between an active position and an inactive position, in the former of which it is engaged with both the body and the bolt means positively to prevent movement of the bolt means to the locking position, and in the latter of which positions it is released from one of the body and bolt means, and e. a key-operated lock secured in assembled relation with the body and comprising a key-receiving member formed with a key-receiving slot and movable relative to the body both rotationally and along the axis of rotation between an outer position and an inner position, the improvement wherein:

f. the key-operated lock comprises tumbler means engageable with the key when the latter is present in the key-receiving member and engageable only when the key-receiving member is in a predetermined rotational position in both the body and the key-receiving member, thereby to prevent rotational movement of the key-receiving member and to permit removal of the key from the key-receiving slot, g. the locking device further comprises means defining a limit of rotational movement of the key-receiving member when in said inner axial position, h. the locking device further comprises means defining a limit of rotational movement of the key-receiving member when in said outer axial position which is further removed from said predetermined rotational position than is the limit when in the inner axial position, and i. coupling means is provided on the key-receiving member for coupling the latter releasably with the retaining element, whereby the retaining element can be moved to the inactive position by movement of the key-receiving member, and j. the respective forms of the coupling means and of the retaining element are such as to provide the capability of movement of the retaining element to the active position whilst the key-receiving member remains in said outer position, and of coupling of the key-receiving member with the retaining element when the latter is in the active position and the former is moved axially to said inner position.

20. In a locking device comprising a lock body, a key-operated lock secured in assembled relation therewith, bolt means mounted in the lock body and movable relative thereto between a locking position and a releasing position in the former of which it is adapted to co-operate with a further member which is required to be locked against movement and in the latter of which positions it is released from said further member to allow same to move, and switch means operable by the key-operated lock for controlling electrical circuit means of the vehicle, the improvement wherein:
   a. the key-operated lock comprises:
      i. a key-receiving member formed with a key-receiving slot and mounted in the body for both rotational movement relative to the body and for movement along the axis of rotation between an inner position and an outer position with respect to the body,
      ii. a plurality of locking tumblers movable in and relative to the key-receiving member for locking the key-receiving member against at least rotational movement relative to the body whilst the key is absent from the key-receiving slot,
   b. the key-receiving member is arranged for rotation when in said outer position only for operation of said switch means, and
   c. means is provided for retaining the bolt means in the releasing position, such means being so arranged as to be rendered inoperative upon performance of a predetermined sequence of movements of the key-receiving member relative to the body, said sequence including at least a rotational movement and an axial movement from the outer position to the inner position.

21. The improvement according to claim 20 wherein the key-receiving slot is permanently closed at one end.

22. The improvement according to claim 20 wherein:
   a. the body is formed with a guideway along which the bolt means is movable,
   b. said means for retaining the bolt means comprises a retaining element movable transversely of said guideway between an active position and an inactive position, in the former of which it is engaged with both the body and the bolt means for positively preventing movement of the bolt means to the locking position, and in the inactive position the retaining element is released from one of the body and bolt means, and
   c. coupling means is provided on the key-receiving member for engagement with the retaining element when the latter is in the active position and when the key-receiving member is moved along its axis from the outer position to the inner position, whereby the retaining element can be moved to the inactive position by movement of the key-receiving member.

23. The improvement according to claim 22 wherein the locking device further includes retainer biasing means for urging the retaining element towards the active position.

24. The improvement according to claim 22 wherein:
   a. the retaining element is mounted in the body for sliding movement in a direction generally parallel to the axis of rotation of the key-receiving member, and
   b. said coupling means is adapted to transmit axial movement from the key-receiving member to the retaining element.

25. The improvement according to claim 22 wherein:
   a. the retaining element is pivotally mounted in the body for movement in a plane generally parallel to the axis of the key-receiving member,
   b. said coupling means is adapted to transmit movement generally in a direction towards and away from the bolt means from the key-receiving member to the retaining element.

26. The improvement according to claim 22 wherein:
   a. said coupling means includes a coupling projecting extending transversely of the axis of the key-receiving member,
   b. said retaining element includes a tooth also extending transversely of the axis of the key-receiving member,
   c. said tooth and said coupling projection lie substantially at the same distance from the axis of rotation of the key-receiving member, and
   d. when the retaining element is in the active position and the key-receiving member is in the inner position the coupling projection and the tooth are offset relative to one another axially, the tooth lying between the coupling projection and the key-receiving member, whereby the key-receiving member can be coupled with the retaining element by rotation of the former when in the inner position, and the retaining element can be withdrawn from the active position to the inactive position by movement of the key-receiving member from the inner position to the outer position.

27. The improvement according to claim 26 wherein:
   a. the tumblers are so formed that end portions of at least some of the tumblers are caused to project from the key-receiving member during insertion or withdrawal of the key into or from the key-receiving slot, and
   b. the housing is formed for receiving such projecting end portions of the tumblers only when the key-receiving member is in the outer position and is in a predetermined first rotational position, whereby projection of said end portions from the key-receiving member when in any other rotational or axial position is prevented by the housing and withdrawal of the key from the key-receiving member when in any other rotational or axial position is prevented.

28. The improvement according to claim 27 wherein:
   a. when the retaining element is in the active position and the key-receiving member is in the outer position said tooth is disposed in the path of rotational movement of the coupling projection, and
   b. the tooth and coupling projection are arranged to overlap axially when the key-receiving member is in the first position of rotation, whereby rotation of the key-receiving member to the first rotational position is prevented whilst the retaining element is in the active position and the key-receiving member is in the outer position.

29. The improvement according to claim 28 wherein:

a. said switch means includes ignition switch contacts for controlling energization of an ignition circuit of a vehicle when the locking device is assembled thereon, said ignition switch contacts being closable by rotation of the key-receiving member, when in the outer position, from said first rotational position to a further rotational position, and b. co-operating means are provided on the key-receiving member and on the housing for preventing axial movement of the key-receiving member to the inner position whilst the key-receiving member is in a rotational position corresponding to a closed condition of said ignition switch contacts.

30. The improvement according to claim 29 wherein stop means is provided for preventing rotation of said key-receiving member whilst in the outer position to close said ignition switch contacts, if the retaining element is in the inactive position.

31. The improvement according to claim 30 wherein said stop means is arranged for moving the retaining element positively into the active position upon rotation of the key-receiving member to close said ignition switch contacts.

* * * * *